Feb. 1, 1938.  G. A. TOAZ  2,106,880

FRUIT JAR

Filed Oct. 24, 1935

INVENTOR.
GLENN A. TOAZ
BY Lewis, Hudson & Kent
ATTORNEYS.

Patented Feb. 1, 1938

2,106,880

UNITED STATES PATENT OFFICE 2,106,880

FRUIT JAR

Glenn A. Toaz, Bedford, Ohio

Application October 24, 1935, Serial No. 46,540

1 Claim. (Cl. 215—37)

This invention relates to fruit jars, and has reference particularly to jars for preserving fruits and other food products where vacuum is employed for holding the lid or cover of the jar in place, and to a method or procedure in the closing of the jar.

One of the objects of the invention is the provision of means of especial simplicity for effectively closing and sealing a fruit jar.

Another object is the formation of a jar and jar lid in such manner that by spinning the lid, after the jar has been filled with the food products, the bubbles which collect on the lower surface of the lid are dislodged, forced to the periphery of the lid, and there discharged.

Other objects and features of novelty will appear as I proceed with the description of that embodiment of the invention which, for the purposes of the present application, I have illustrated in the accompanying drawing, in which Fig. 1 is a central vertical sectional view of a fruit jar and lid embodying the invention.

Figure 1:
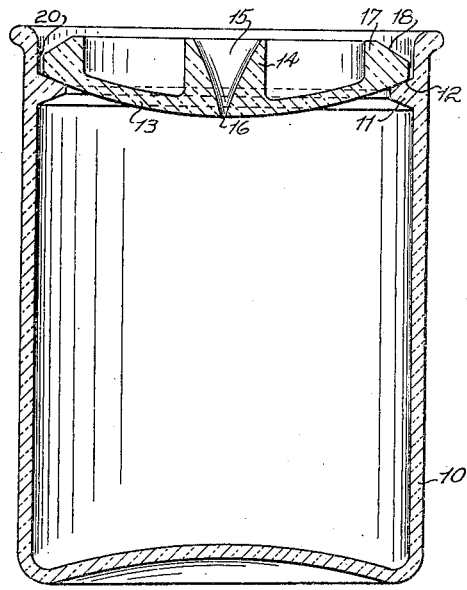
Figure 2:
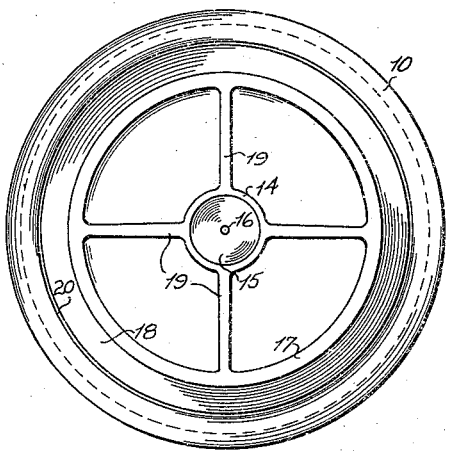
Fig. 2 is a plan view thereof.

In the drawing I have shown a glass jar 10 which is preferably of substantially the same diameter throughout its extent, in order that there may be no difficulty in putting whole fruits into the jar. It can, of course, be made relatively deeper than the drawing indicates, thereby increasing its capacity.

Near the upper end of the jar I provide an integral inner ledge 11. This ledge has an upper surface 12 which is inclined or beveled downwardly and inwardly. The ledge also preferably has an upwardly and inwardly inclined lower surface which is desirable not only because it facilitates cleaning, but also because it deflects inwardly and upwardly any air bubbles that rise along the sides of the jar during the filling of the same and prior to its being sealed. The ledge 11, in addition to providing a seat for the cover or lid of the jar, reenforces the jar at its upper open end.

The lid or cover is of a special design, and its design in combination with the design of ledge 11 is responsible for the improved results of the present jar. The lid comprises a part 13 which is in effect a circular fragment of a hollow sphere. At any rate that is its preferred form. In any event the entire lower surface of the lid is a surface of revolution taken about the central vertical axis of the lid. While it is not essential that this lower surface correspond to a true sphere, it is essential that the lowest point of the surface be in the center and that the surface rise gradually toward the periphery of the lid. This lower surface could be that of an inverted cone for instance. The spherical shape illustrated is preferred however. The curvature near the periphery of the lid and the inclination of the ledge surface 12 should correspond fairly closely, so that a good seat for the lid is provided.

At the center of the lid there is a boss 14, cylindrical in shape, extending upwardly from the main or spherical portion of the lid. In this boss there is a funnel shaped socket 15 which extends entirely through the lid, providing an opening 16 of small dimensions at the central point of the lower spherical surface.

At the periphery of the lid there is an annular reenforcing rib 17 extending upwardly from the main spherical portion to a height preferably the same as that of the boss 14. This rib may be beveled off on the outer side as shown at 18. The boss 14 and the rib 17 are joined at regular intervals by radial reenforcing ribs 19, which also extend upwardly from the main spherical portion preferably to the same height as the central boss 14 and annular rib 17. The diameter of the lid is somewhat less than the inner diameter of the jar, so that a small clearance 20 is left all around the lid when the latter is in place in the jar.

Figure 3:
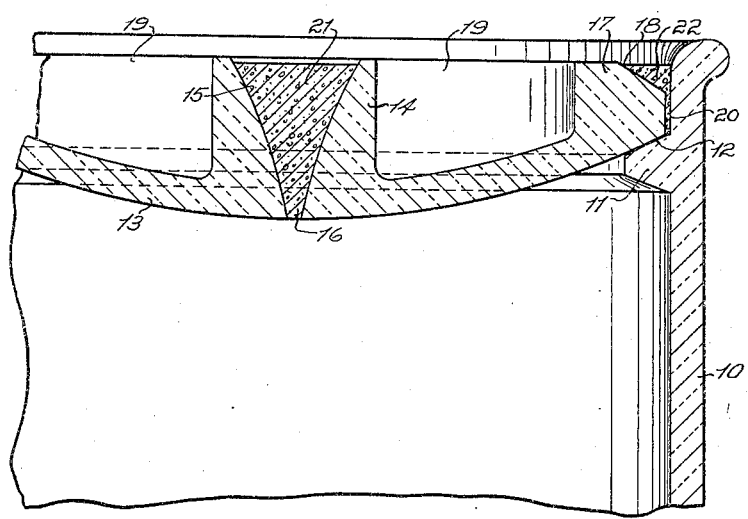
Fig. 3 is a fragmental view similar to Fig. 1 on a larger scale, the sealing compound being shown in place.

The funnel shaped socket 15 and the space surrounding the lid are sealed with a suitable sealing compound, preferably one which becomes liquid when heated. Paraffine is suitable for the purpose, and illustrated at 21 and 22 in Fig. 3.

When fruit or other food products are to be put up in my improved jar, the jar is filled with such product until the hot juices rise to a height approximately that of the ledge 11. A lid is next placed in the jar, the lower spherical surface thereof contacting with the juices in the jar. A little time having been allowed for air bubbles in the liquid to rise to the top of the same, and while the contents of the jar are still hot, the operator grips the boss 14 with his thumb and fingers in the depressions between the ribs 19 and gives the lid a spin or twirl, which he may readily do since the seat 12 is lubricated with the liquid in the jar. This revolving motion of the lid acts by centrifugal force to dislodge any air bubbles that may have collected on the bottom surface of the lid and to throw them outward and upward over the lower surface of the lid to the periphery thereof, where they escape through the clearance 20. The operator now pours liquid paraffine into the socket 15 and into the space surrounding the lid and above the beveled surface 18 thereof. The contents of the jar are now permitted to cool. As they do so the liquid in the jar contracts to some extent, the paraffine 21 and 22 following it down more or less, that is until the paraffine begins to solidify. By the time the cooling process has been completed a considerable vacuum will have been set up beneath the lid, and the central opening 16 and the peripheral clearance 20 will have been effectively sealed. The lid will then be held in place by atmospheric pressure. When the contents of the jar are to be used, it is necessary merely to insert a small pointed instrument, like an ice pick, into the socket 15 and down through the opening 16, when air will be admitted to the inside of the jar, relieving the pressure on the top of the lid. The latter may then be readily lifted off or pried up, exposing the contents of the jar.

Having thus described my invention, I claim:

A method of eliminating bubbles from the interior of a jar of the type in which a closure with a bottom surface extending upwardly and outwardly from the center directly engages the contents of the jar, which consists in spinning the closure after application whereby the bubbles are discharged radially to the edge of the closure.

GLENN A. TOAZ.